(12) United States Patent
Munemura et al.

(10) Patent No.: US 6,702,387 B2
(45) Date of Patent: Mar. 9, 2004

(54) SEAT-BACK FRAME FOR VEHICLES (75) Inventors: Nozomu Munemura, Yokohama (JP); Yorisuke Matsufuji, Yokohama (JP); Tomiteru Masuda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/951,556

(22) Filed: Sep. 14, 2001

(65) Prior Publication Data
US 2002/0063464 A1 May 30, 2002

(30) Foreign Application Priority Data
Sep. 25, 2000 (JP) ........................................ 2000-290855

(51) Int. Cl.[7] ................................................. A47C 7/02
(52) U.S. Cl. ............................ 297/452.18; 297/216.13; 297/216.14; 297/216.1
(58) Field of Search .................. 297/452.18, 216.13, 297/216.14, 216.1, 440.15, 463.1, 463.2

(56) References Cited

U.S. PATENT DOCUMENTS

| | | | |
|---|---|---|---|
| 5,219,202 A | | 6/1993 | Rink et al. |
| 5,310,030 A | * | 5/1994 | Kawakita et al. ............ 188/371 |
| 5,366,268 A | * | 11/1994 | Miller et al. .............. 297/216.1 |
| 5,499,863 A | * | 3/1996 | Nakane et al. ......... 297/452.18 |
| 5,597,205 A | * | 1/1997 | Glance et al. ......... 297/362.14 |
| 5,676,421 A | * | 10/1997 | Brodsky ................. 297/216.13 |
| 5,722,730 A | * | 3/1998 | McKernan ................ 297/463.1 |
| 6,053,571 A | | 4/2000 | Faigle |
| 6,375,268 B2 | * | 4/2002 | Okazaki et al. ........ 297/452.18 |

FOREIGN PATENT DOCUMENTS

EP     0888926 A     7/1999

OTHER PUBLICATIONS

US Pub. 2001/0006302 Nagayasu et al.*
US Pub. 2002/0050729 Nakano.*

* cited by examiner

Primary Examiner—Peter M. Cuomo
Assistant Examiner—Erika Garrett
(74) Attorney, Agent, or Firm—Lowe Hauptman Gilman & Berner, LLP (57) ABSTRACT

The purpose of this invention is to simplify the structure for softening the shock of a rear-end collision. The lower portion of each of its right-side and left-side members 3, which are made of sheet steel, include a plurality of holes 7 and 8 in which fastening bolts 11 and 12 are inserted so as to connect the side members 3 with an external member. The fastening bolt 11 is capable of contacting the hole brim of a hole, and by installing such a fastening bolt 11 in all of the holes, or in all of the holes but one, the shock of a rear-end collision is softened.

14 Claims, 5 Drawing Sheets

Displacement of the loading point

SEAT-BACK FRAME FOR VEHICLES

BACKGROUND OF THE INVENTION

1. Field of the Invention

The present invention relates to a seat-back frame for vehicles that is capable of protecting the persons sitting in the car from the shock of a rear-end collision.

2. Description of the Related Art

To soften the shock within a vehicle that is hit in a rear end collision, it is desirable that the car's seat-back frames should move backward and rotate while absorbing the energy of the collision. Therefore, it is preferable to increase the amount of the rotation in the lower portion of the seat-back frame. However, in order to protect the vertebrae of the persons in the car during such a collision, it is desirable that the lower portion of the seat-back frame should change in shape. Therefore, the problem is that the protection of the vertebrae is insufficient when the amount of the rotation in the lower portion of the seat-back frame increases as described above, because when the amount of that rotation increases, the momentum of the rotation acts on the vertebrae. For these reasons, in a conventional seat-back frame for vehicles, the rotation of the seat-back frame is limited to a specified amount.

For example, in the VOLVO S80 vehicle, a rear-shock-absorbing system is built into the seat-reclining system. Thereby, if a rear-end collision occurs, the lower part of the seat-back frame moves backward and the upper part thereof moves forward so as to push the head forward and to hold it and thereby to protect it. Then, while the back is held by the seat-back frame, the entire seat-back frame falls backward (while pushing the head forward and holding it, so as to prevent a whiplash injury) whereby the force pushing the head forward is softened. However, if a rear-shock-absorbing system is built into the seat-reclining system, two problems result: (1) the structure of the seat-reclining system is complicated and hence is very costly; and (2) the whole seat becomes so heavy that it is difficult to handle.

However, there is a different structure such that a notch is furnished in the lower portion of the seat-back frame, and if shock results due to a rear-end collision the seat-back frame is changed in shape, with said notch being the starting point of such change. But such a structure has the problem that the load for the backward movement and rotation of the seat-back frame is inconstant, so that stable behavior is impossible.

SUMMARY OF THE INVENTION

The present invention is intended to solve the problems observed in the art. The object of the present invention is to provide a seat-back frame that, with a simple structure and without being heavier in weight than a conventional frame, is capable of protecting the passengers in a car from the shock of a rear-end collision.

In order to attain the object described above, a seat-back frame of the invention is provided, wherein, (1) the seat-back frame has right-side and left-side members that are made of sheet steel and that have a number of holes in their lower portions, (2) each of the side members is fastened to an external member (such as a seat-reclining system) by fastening bolts that are inserted in each of the holes, and (3) the fastening structure is configured so that the brims of all of the holes, or all of the holes but one, are able to make contact with their respective aforementioned fastening bolts.

If a rear-end collision occurs, a rotation-movement force acts on the seat-back frame, moving it backward. In this invention, the structure is arranged so that the fastening bolts and the brims of the holes are capable of making contact with each other, and, due to the force of the rotation of the seat-back frame, the fastening bolt moves while making contact with the brim of the hole so as to elongate the hole. Therefore, the seat-back frame is able to move backward while rotating, so that the external force of the rear-end collision is absorbed by such a movement. Thereby, the passenger sitting on the seat is protected.

In this invention, a complicated shock-absorbing system is not necessary, and the protection of a person in the seat can be secured by a seat-back frame that has a simple structure and that is not heavier than that of a conventional model.

In accordance with an aspect of the invention, the aforementioned fastening bolt for each of the holes but one is furnished with a free nut that is not welded to the side member.

In this invention, one or more of the holes of the side members are elongated by a respective fastening bolt that is furnished with a free nut. Therefore, the passenger in the car is protected by the inventive seat-back frame that has a simple structure.

In accordance with an aspect of the invention, at least one each of the aforementioned holes is placed toward the front portion of the lower part of the side member and at least one hole is placed toward the rear portion thereof, and the fastening bolt that is inserted in the front-side hole is furnished with a free nut, while the fastening bolt that is inserted in the rear-side hole is furnished with a welding nut.

In this invention, the rear portion of the side member is strongly held by the welding nut, wherefore the holding force of the hole at the front end of the side member is less than that of the hole at the back end. Therefore, when external force is applied, the front-side hole is elongated by the movement of the fastening bolt, so as to protect the person in the seat.

Also, in the operation described above, the whole seat-back frame moves backward and rotates while holding the back of the person sitting in the seat, with the lower portion of the seat-back frame as the center of said rotation, so that the protection of the vertebrae of the person is secured.

In accordance with an aspect of the invention, each side member includes a stopper flange that limits the external-force-caused movement of each fastening bolt that is attached to a free nut.

The stopper flange limits to a specified amount the forced movement of the fastening bolt that is attached to a free nut, and therefore the rotation of the seat-back frame will not exceed a specified amount. Accordingly, excessive stress does not act on the vertebrae of the person in the seat and consequently the person is protected from the force of a rear-end collision.

In accordance with an aspect of the invention, the aforementioned external member is a seat-reclining system of the seat.

Accordingly, the shock of a rear-end collision is transferred from the seat-reclining system to the side members, and the whole seat-back frame moves backward while rotating, so that the person in the seat is protected.

DESCRIPTION OF THE PREFERRED EMBODIMENTS

FIG. 1 to FIG. 10 show embodiments of the present invention.

Figure 1:
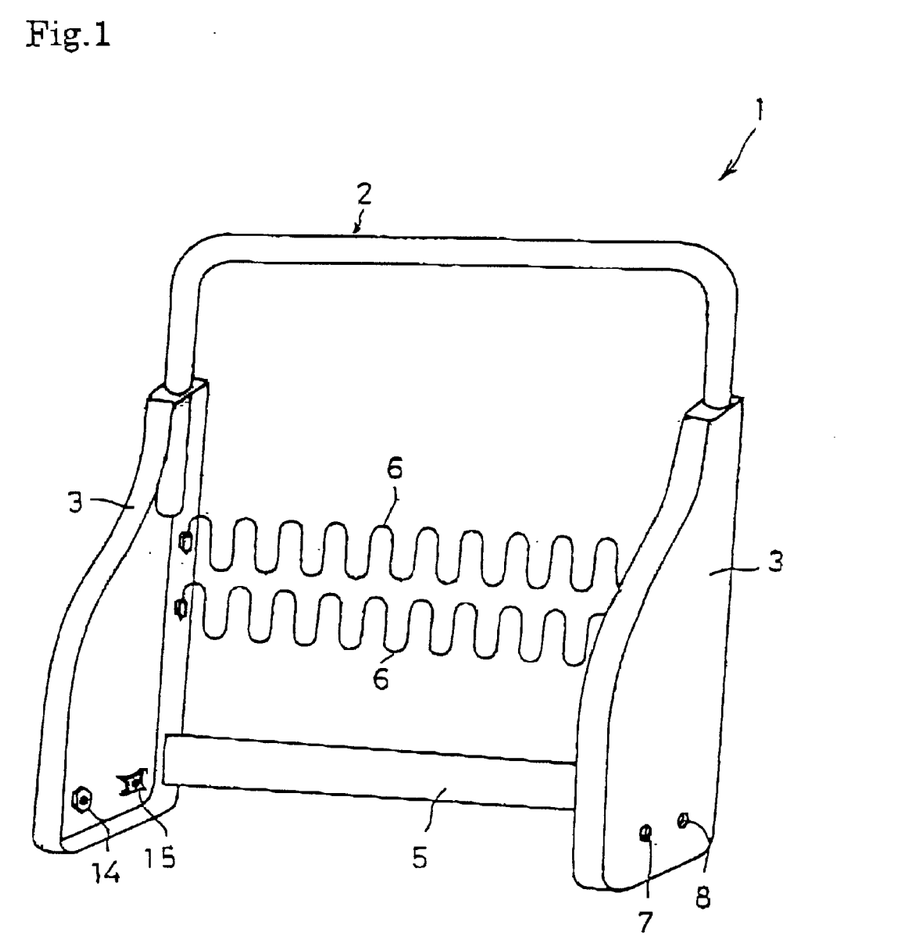
FIG. 1 is a perspective view of one embodiment of the present invention.

FIG. 1 shows a seat-back frame 1 of one embodiment. The seat-back frame 1 consists of a pipe 2 as its upper-support portion, two side members 3 (which compose a set), a plate 5 as its lower-support portion, and a cushion S-spring 6.

The pipe 2 is bent so as to be shaped like the letter "n," and each end of said pipe 2 is inserted into one of two side members 3. After the pipe 2 is inserted, the upper portion of each side member 3 is welded and/or caulked (hammered) so as to prevent the ends of the pipe 2 from coming out of the side members 3. Each of the two ends of the plate 5 is welded to its respective side member 3. Also, a cushion S-spring 6 is placed between the two side members 3 and situated below the pipe 2 and above the plate 5, with each end of said cushion S-spring 6 being attached to its respective side member 3 by latching.

Figure 2:
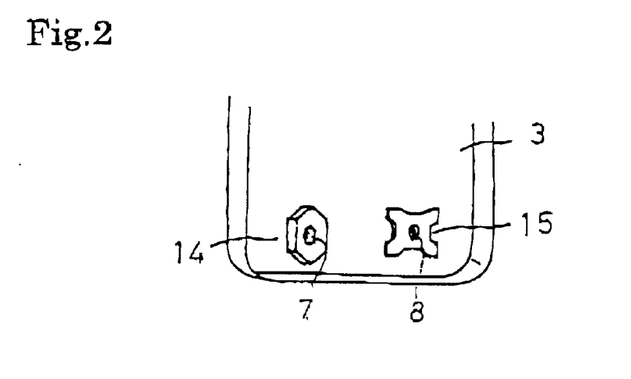
FIG. 2 is a perspective view illustrating a principal part of FIG. 1.

Each of the side members 3 is formed by punch-pressing sheet steel. The lower portion of these side members 3 is designed so that the seat-back frame can be installed in a seat-reclining system (not shown in the drawings) that is an external member. That is to say, as shown in FIG. 2, the lower portion of each of the side members 3 includes a forward-portion hole 7 and a rear-portion hole 8, that are used for installing the seat-back frame in a seat-reclining system.

Figure 3:
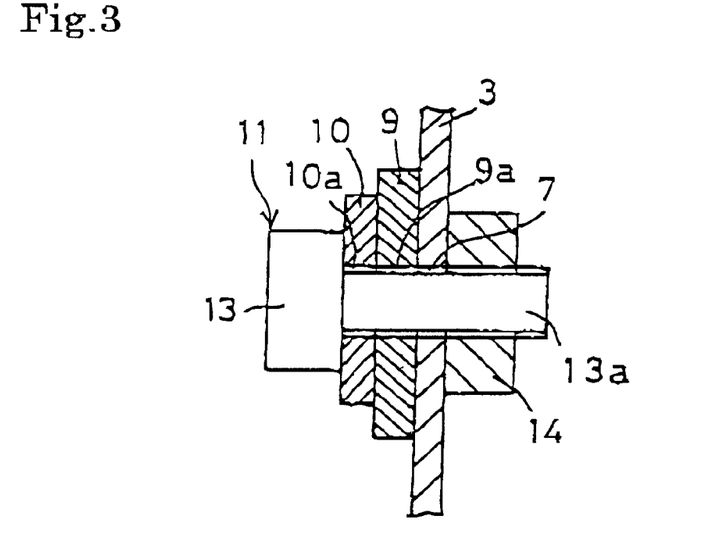
FIG. 3 is a cross-sectional view of a fastening bolt furnished with a free nut.
Figure 4:
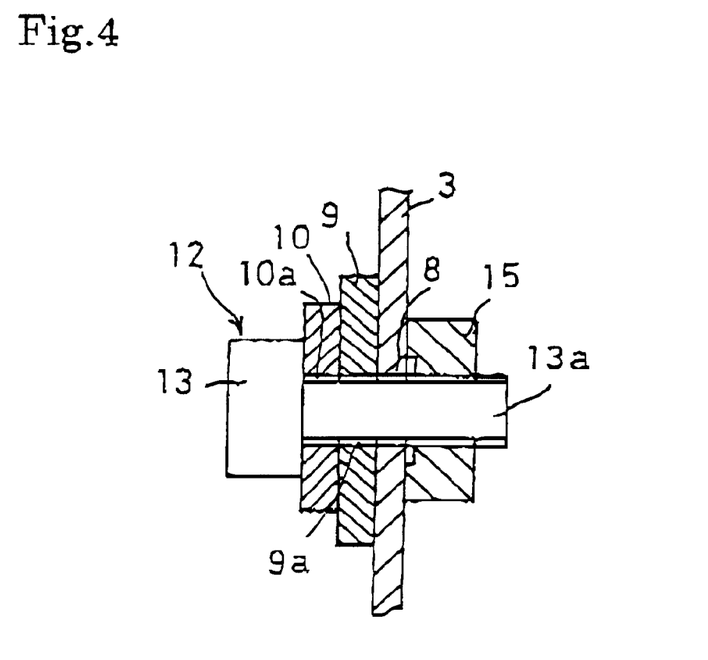
FIG. 4 is a cross-sectional view of a fastening bolt furnished with a welding nut.

FIG. 3 and FIG. 4 show how the seat-back frame is installed in a seat-reclining system by using the holes 7 and 8. FIG. 3 shows the structure for the forward-portion, while FIG. 4 shows the structure for the rear portion. As shown in these drawings, the seat-reclining system has two brackets 9 that are steel plates, each of which makes contact with the external surface of one of the side members 3. The seat-reclining system's brackets 9 are pressed against the seat-back frame's side members 3 by the use of fastening bolts 11 and 12, each of which is inserted through a washer 10, a bracket 9, and either a free nut 14, in the case of the fastening bolt 11, or a welding nut 15, in the case of the fastening bolt 12. Both the bracket 9 and the washer 10 contain, respectively, a bracket hole 9a and a bolt washer hole 10a, which respectively align with the holes 7 and 8 of the side members 3. Fastening bolts 11 and 12 are inserted though all three holes, and then the appropriate nut is attached to the bolt rod 13a of each of the fastening bolts 11 and 12.

The bolt head 13 is positioned on the outer side of the side member 3, while a free nut 14 or a welding nut 15 is positioned on the inner side of the side member 3. The seat-back frame is connected to the seat-reclining system by tightening the fastening bolts 11 and 12 under the condition that the aforementioned washer 10, the side member 3, and the bracket 9 are sandwiched between the bolt head 13 and a free nut 14 or a welding nut 15, as appropriate.

In the present specifications, a free nut 14 is an ordinary nut, i.e., a nut that is not fixed on a certain bolt by welding or the like. Accordingly, the free nut 14 is under a free condition and functions in such a way that it is fastened together with a fastening bolt 13 simply by engaging (i.e., tightening the nut). The free nut 14 that is used for the fastening bolt 11 shown in FIG. 3 functions in such a way that the side member 3, the bracket 9 and the washer 10 are fastened only by being engaged with the bolt rod 13a (the axis portion of the bolt 11), which passes through the hole of each of those three pieces. Therefore, the fastening bolt 11 in which the free nut 14 is furnished can displace in the direction crossing the axial direction of the bolt head 13, and the bolt rod 13a displaces inside the hole 7 of the side member 3, wherefore the bolt rod 13a is enabled to touch the brim of the hole 7. A hexagonal nut, a caulking nut, or the like can be used as the free nut 14.

The welding nut 15 that is used for the fastening bolt 12 shown in FIG. 4 is welded on the inner side of the side member 3. The fastening bolt 12 is inserted through the washer 10, the bracket 9, and the side member 3, with the bolt head 13 on the outer side of the side member 3, under the condition such that the welding nut 15 is fixed by welding on the inner side of the side member 3, and such that the bolt rod 13a of the fastening bolt 12 is engaged with the welding nut 15 in a fixed condition so as to fasten the side member 3 to the seat-reclining system. Therefore, the fastening bolt 12 shown in FIG. 4 does not displace in the direction that crosses the axial direction of the bolt head 13, because the welding nut 15 is fixed on the side member 3. Consequently, the bolt rod 13a of the fastening bolt 12 is under the condition of not contacting with the brim of the hole 8 of the side member 3.

Figure 5:
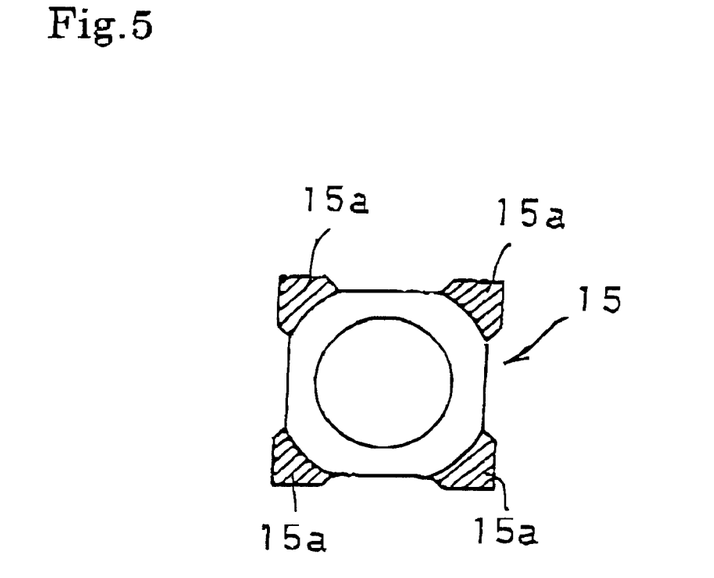
FIG. 5 is a front view of a welding nut.

FIG. 5 shows a welding nut 15, for which a welding nut specified in "JIS B1196" can be used. In the welding nut 15, a welding portion 15a is formed at each of the four corners, and each of these welding portions 15a is welded to the side member 3.

By using a welding nut 15, the bonding power between the welding nut 15 and the side member 3 is stronger than if a free nut were to be used, and therefore the holding power of the bracket 9 of the seat-reclining system is stronger than if a free nut were to be used. Therefore, the holding force of the bracket 9 of the seat-reclining system is stronger at the rear portion of the side member 3, where the welding nut 15 is installed, than at the front portion, where the free nut 14 is installed.

For this reason, the holding force of the bracket 9 is relatively weak at the front portion of the side member 3. In addition, if there is a rear-end collision, the axis portion 13a of the fastening bolt 11 that is using the free nut 14 contacts with the hole brim of the hole 7 due to the external force applied as a result of the collision. This contacting pressure causes the hole 7 to elongate.

Figure 6:
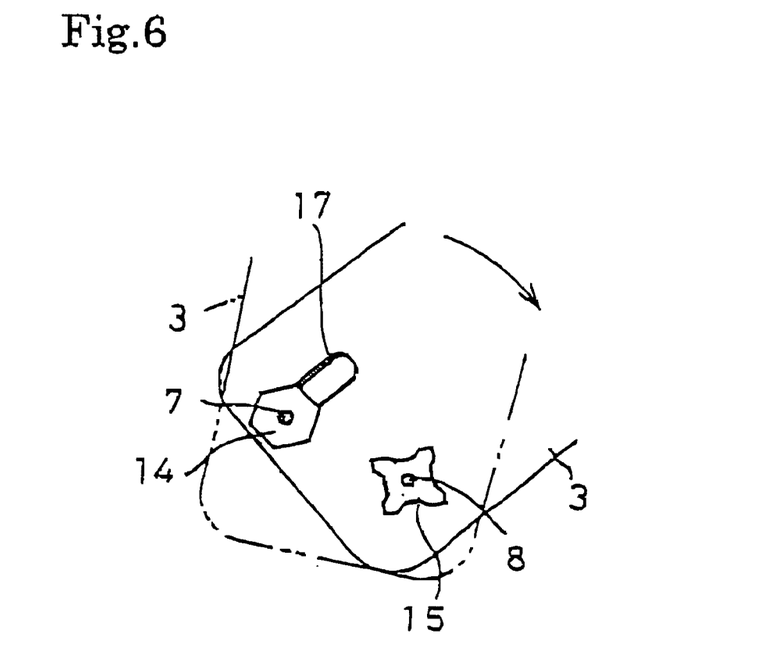
FIG. 6 is a side view showing the movement of a side member at the time of a rear-end collision.

FIG. 6 shows the behavior of the side member 3 when an external force is applied due to a rear-end collision. Although the rear portion of the side member 3 is strengthened by the welding nut 15, the strength of the front portion of the side member 3 is less than that of the rear portion thereof. As a result, when the force of the shock of a rear-end collision is applied, the side member 3 rotates backward and pushes the free nut 14 backward, with the welding nut 15 functioning as the center around which such rotation occurs. At the time of such rotation, the hole 7 of the side member 3 is elongated by the fastening bolt 11 to which the free nut 14 is engaged, wherefore the whole seat-back frame 1 can move backward and rotate. In FIG. 6, the symbol 17 denotes the elongated part of the hole 7.

By such movement, the shock of a rear-end collision is absorbed and softened. Because the contacting pressure necessary to elongate the hole 7 is invariable regardless of the amount of elongation of the hole 7, a large amount of energy can be absorbed. Also, for the same reason, an endurable maximum impact force can be set by the manufacturer of the automobile. Furthermore, in this embodiment, only ordinary bolts and nuts are used, and such a complicated system as a rear-shock-absorbing system is not needed, and therefore the structure of the seat-back frame can be simple and lighter in weight than that of a conventional system. In addition, the assembly of said seat-back frame can be easier, so that the cost and the price thereof can be lower than that of a conventional system.

Figure 7:
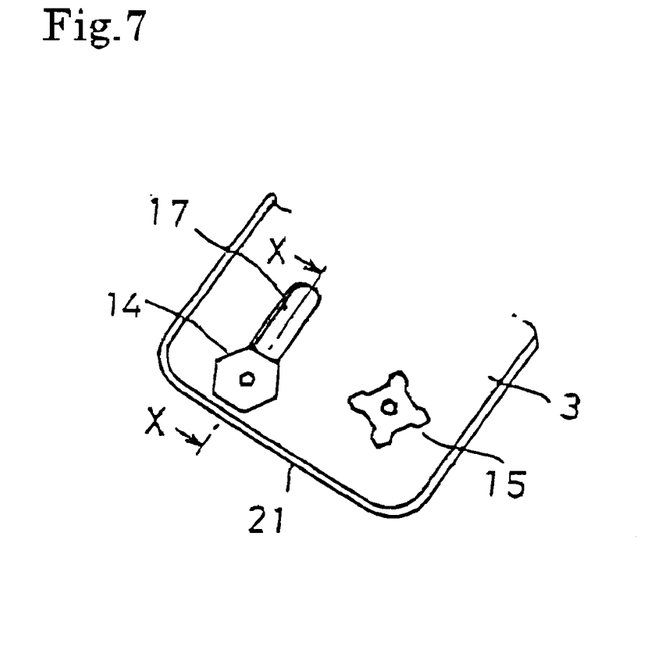
FIG. 7 is a partial-perspective view of another embodiment of the present invention.
Figure 8:
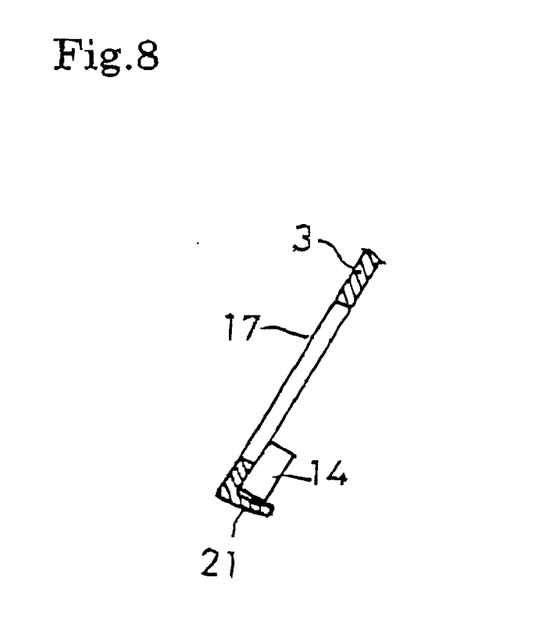
FIG. 8 is a cross-sectional view of a side member along the line X—X in FIG. 7

FIG. 7 and FIG. 8 show another embodiment of the present invention, in the case of which the same items that are in the above-mentioned embodiment are denoted by the same numbers for the sake of correspondence. In this embodiment, a stopper flange 21 is furnished as part of each side member 3.

The stopper flange 21 is formed by bending the lower end portion of the side member 3 inwardly like the capital letter "L," so that the stopper flange 21 is part of the body of the side member 3. Accordingly, the stopper flange 21 is positioned on the free-nut side of the side member 3 and below the free nut 14.

In such an embodiment, if there occurs a rear-end collision the whole seat-back frame 1 moves backward and rotates due to the force of the shock of the collision, and the hole 7 of the side member 3 is elongated upwardly as the rotation continues. Consequently, while the elongated part 17 is being formed in the hole 7, the free nut 14 is forced to move toward the lower side of the side member 3. This forced movement is stopped when the free nut 14 contacts the stopper flange 21.

In such a structure, the elongation of the hole 7 is limited to a specified amount by the stopper flange 21, so that the extent of the backward movement and rotation of the seat-back frame 1 does not exceed a specified amount. Accordingly, the vertebrae of a person sitting in the seat are not subject to excessive pressure, wherefore proper protection of the person is possible.

Further, the present invention is not limited to the embodiments described above, and it can be embodied in various other forms. For example, the fastening bolt 11 that is furnished with a free nut 14 can be inserted in all of the holes of both the right-side and the left-side members 3 or in all of the holes but one. In such a case, for a hole in which a fastening bolt 11 will be inserted without being furnished with a free nut 14, there is instead inserted a fastening bolt 12 that is furnished with a welding nut 15. Also, as another variation, three or more holes can be formed in each of the side members 3, and a fastening bolt can be inserted in each of the holes. Furthermore, as another variation, for the external member that is installed between the inner sides of the side members 3, any external member that enables the shock to be transmitted to the seat-back frame 1 during a rear-end collision is acceptable, wherefore a rock anchor that is used when the seat-back frame 1 is made to rise or to be lowered by hand can be used. Other types of external members also can be used.

Figure 9:
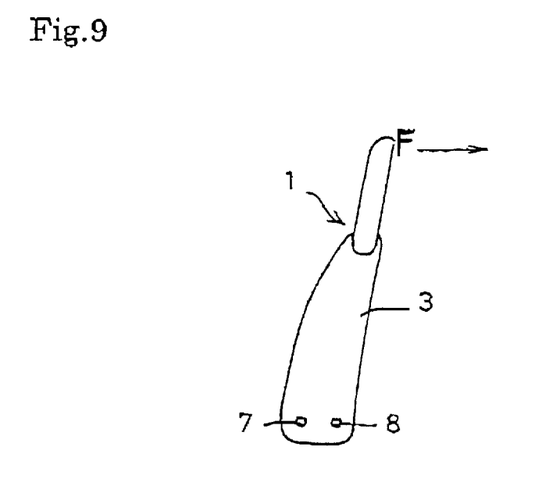
FIG. 9 is a side view illustrating the effect of the present invention.

FIG. 9 illustrates the condition of the seat-back frame 1 when it is rising on an appropriate supporting member (not shown in the drawing) where the front hole 7 and the rear hole 8 in the lower portion of the side member 3 are connected with the supporting member. A fastening bolt 11, with which a free nut 14 is furnished, is inserted in the hole 7 (as shown in FIG. 3), and a fastening bolt 12, with which a welding nut 15 is furnished, is inserted in the hole 8 (as shown in FIG. 4). Also, a stopper flange 21 (as shown in FIG. 7) is formed as part of each of the two side members 3.

Figure 10:
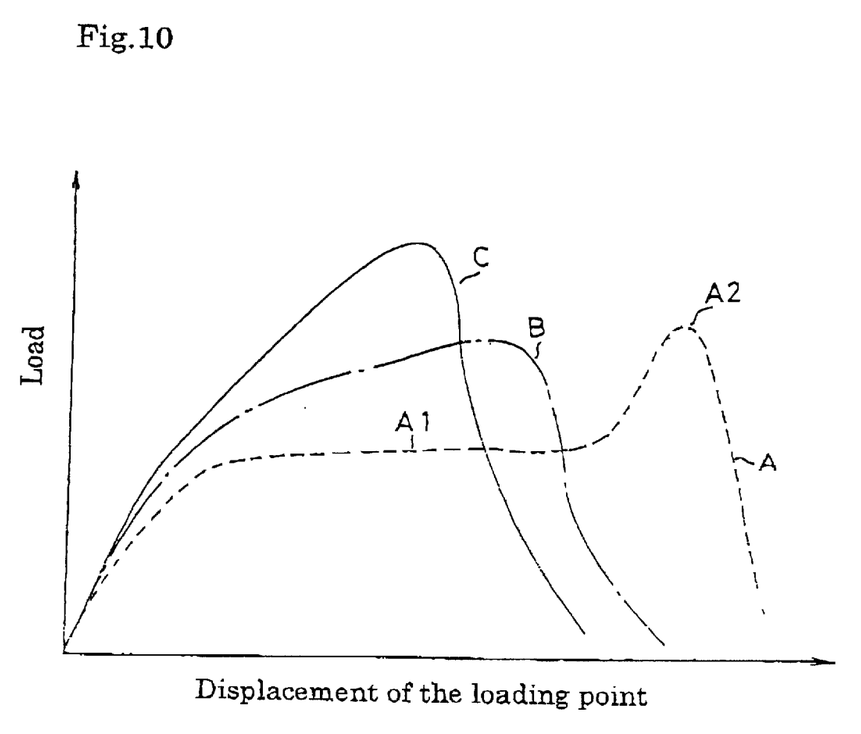
FIG. 10 is a diagram containing curves that show the horizontal displacement of the force loading point under the conditions of three different embodiments of the present invention.

In this example of the embodiment, a load, such as that of the force resulting from a rear-end collision whose direction is indicated by the arrow F was applied to the upper end of the seat-back frame 1 in the horizontal direction under the condition shown in FIG. 9, and the horizontal displacement of the loading point was measured. FIG. 10 shows the result of that measurement. The curve A shows the horizontal displacement of the loading point in response to an increase in the load in the case of the seat-back frame of this embodiment example. The curve B shows the horizontal displacement of the loading point in response to an increase in the load in the case of a seat-back frame furnished with a notch in its lower portion. The curve C shows the horizontal displacement of the loading point in response to an increase in the load in the case of a seat-back frame in which a bolt with a welding nut is used for the front and the rear holes thereof.

The curve A includes a flat portion A1, where the increase of the load is small, and a peak part A2, where the load is at its highest. In the flat part A1 the energy of the shock is being absorbed while in the peak part A2 the backward rotation of the seat-back frame is being limited. Consequently, absorption and softening of the high energy of the rear-end collision can be secured, and an endurable maximum amount of impact force can be set easily.

According to the invention, protection of a person in a seat in the car can be secured with a simple structure without a complicated shock-absorbing system and without being much heavier than a conventional system.

According to an aspect of the invention, there is inserted a fastening bolt that is furnished with a free nut and that elongates the hole of the side member so that a person sitting in the seat in the car is protected by a simple structure.

According to another aspect of the invention, the fastening bolt of the forward portion of the side member elongates the hole of the side member when external force is applied, so as to protect a person sitting in a seat in the car. Also, the whole seat-back frame moves backwards and rotates, with the lower portion of the seat-back frame as the center of such rotation, so that the protection of the vertebrae of a person sitting in the seat can be secured.

According to a further aspect of the invention, the extent of the rotation of the seat-back frame does not exceed a specified amount, so that excessive pressure is not applied to the vertebrae of a person in the seat, and thereby the person is protected.

According to yet another aspect of the invention, the whole seat-back frame moves backward and rotates by means of the seat-reclining system, so that the person in the car seat is protected.

Explanation of Numbers in the Drawings

1 Seat-back frame
2 Pipe
3 Side members
5 Plate
6 Cushion s-spring
7 Forward-portion bolt hole
8 Rear-portion bolt hole
9 Bracket
9a Bracket hole
10 Washer
10a Washer hole
11 Fastening bolt for free nut
12 Fastening bolt for welding nut
13 Bolt head
13a Bolt rod
14 Free nut
15 Welding nut
15a Welding portion of welding nut
17 Elongated part of forward-portion hole of side member
21 Stopper flange
A Curve showing horizontal displacement of loading point under one embodiment
A1 Flat portion of curve A
A2 Peak of curve A
B Curve showing horizontal displacement of loading point under an embodiment of a seat-back frame furnished with a notch in its lower portion
C Curve showing horizontal displacement of loading point under an embodiment of a seat-back frame in which a bolt with a welding nut is used for the front and the rear holes thereof
F direction of the load of the force resulting from a rear-end collision

What is claimed is:

1. A seat-back frame for a vehicle, comprising a right-hand side member and a left-hand side member which are made of sheet steel, each of said side members including a plurality of holes provided in a lower portion of said side member, a plurality of bolts each inserted through one of said holes so as to connect said side member with an external member, and a plurality of nuts each fastened to one of said bolts so as to fasten said side member to the external member;
   wherein said holes are round holes, and all of said nuts are free-nuts that are not welded to said side member, said nuts being fastened to the bolts so that at least one of the bolts is moveable by deformation of the respective hole by the action of an impact force at the time of a rear-end collision of the vehicle.

2. The seat-back frame as set forth in claim 1, wherein the holes are arranged at least in front and rear portions of the lower portion of the side member.

3. The seat-back frame as set forth in claim 1, wherein a bottom edge of the side member is bent so as to form a stopper flange that limits a movement of the free-nut that is fastened to and moves with said at least one bolt under the action of the impact force caused by the rear-end collision.

4. The seat-back frame as set forth in claim 1, wherein the external member is a seat-reclining system.

5. A seat-back frame for a vehicle, comprising a right-hand side member and a left-hand side member which are made of sheet steel, each of said side members including a plurality of holes provided in a lower portion of said side member, a plurality of bolts each inserted through one of said holes so as to connect said side member with an external member, and a plurality of nuts each fastened to one of said bolts so as to fasten said side member to the external member;
   wherein said holes are round holes, one of said nuts is a welding nut that is welded to said side member, and all the other nuts are free-nuts that are not welded to said side member, said nuts being fastened to the bolts so that at least one of the bolts that is furnished with one of the free-nuts is moveable by deformation of the respective hole by the action of an impact force at the time of a rear-end collision of the vehicle.

6. The seat-back frame as set forth in claim 5, wherein said holes are arranged at least in front and rear portions of the lower portion of the side member, at least one of the free-nuts and the associated bolt are arranged in the front portion, and the welding nut and the associated bolt are arranged in the rear portion.

7. The seat-back frame as set forth in claim 5, wherein a bottom edge of the side member is bent so as to form a stopper flange that limits a movement of the free-nut that is fastened to and moves with said at least one bolt under the action of the impact force caused by the rear-end collision.

8. The seat-back frame as set forth in claim 5, wherein the external member is a seat-reclining system.

9. A rear-end collision safety system for vehicle, comprising: a seat-back frame which comprises upper and lower connecting elements and two side members connected by said upper and lower connecting elements, each of said side members including a plurality of holes provided in a lower portion thereof;
   an external member;
   a plurality of bolts each inserted through one of said holes and fastening said side members to said external member;
   wherein said holes are round holes, and said seat-back frame is fastened to said external member with a greater holding force at one of said bolts and with a smaller holding force at the other bolts so that said frame rotates about said bolt having the greater holding force, under action of an impact force at the time of a rear-end collision of the vehicle, causing at least one of said bolts having the smaller holding force to slide on the respective side member to come into contact with an edge of the respective hold and elongate said hole, thereby absorbing the shock associated with the impact force.

10. A rear-end collision safety system for vehicle, comprising:
   a seat-back frame which comprises upper and lower connecting elements and two side members connected by said upper and lower connecting elements, each of said side members including a plurality of holes provided in a lower portion thereof;
   an external member;
   a plurality of bolts each inserted through one of said holes and fastening said side members to said external member;
   wherein said seat-back frame is fastened to said external member with a greater holding force at one of said bolts and with a smaller holding force at the other bolts so that said frame rotates about the bolt having the greater holding force, under action of an impact force at the time of a rear-end collision of the vehicle, causing at least one of the bolts having the smaller holding force to slide on the respective side member to come into contact with an edge of the respective hole and elongate said hole, thereby absorbing the shock associated with the impact force; and wherein said bolt having the greater holding force is arranged in a back area of the respective side member, and said bolt having the smaller holding force that moves during the rear-end collision is arranged in a front area of the respective side member so that, when the impact force applies, said frame rotates backward about said bolt having the greater holding force, causing a forward and downward relational movement of said bolt having the smaller holding force with respect to the respective side member of said frame.

11. The system of claim 10, wherein the side member associated with said bolt having the smaller holding force is provided with a stopper flange that limits said forward and downward relational movement.

12. The seat-back frame as set forth in claim 9, wherein said external member is a seat-reclining system.

13. A rear-end collision safety system for vehicle, comprising:

a seat-back frame which comprises upper and lower connecting elements and two side members connected by said upper and lower connecting elements, each of said side members including a plurality of holes provided in a lower portion thereof;

an external member;

a plurality of bolts each inserted through one of said holes and fastening said side members to said external member;

wherein said seat-back frame is fastened to said external member with a greater holding force at one of said bolts and with a smaller holding force at the other bolts so that said frame rotates about the bolt having the greater holding force, under action of an impact force at the time of a rear-end collision of the vehicle, causing at least one of the bolts having the smaller holding force to slide on the respective side member to come into contact with an edge of the respective hold and elongate said hole, thereby absorbing the shock associated with the impact force; and wherein said bolt having the greater holding force is engaged with the respective hole by thread while said bolt having the smaller holding force is not in positive engagement with the respective hole.

14. A rear-end collision safety system for vehicle, comprising:

a seat-back frame which comprises upper and lower connecting elements and two side members connected by said upper and lower connecting elements, each of said side members including a plurality of holes provided in a lower portion thereof;

an external member;

a plurality of bolts each inserted through one of said holes and fastening said side members to said external member;

wherein said seat-back frame is fastened to said external member with a greater holding force at one of said bolts and with a smaller holding force at the other bolts so that said frame rotates about the bolt having the greater holding force, under action of an impact force at the time of a rear-end collision of the vehicle, causing at least one of the bolts having the smaller holding force to slide on the respective side member to come into contact with an edge of the respective hold and elongate said hole, thereby absorbing the shock associated with the impact force; and wherein the nut associated with said bolt having the greater holding force is a welding nut that is welded to the respective side member, while the nut associated with said bolt having the smaller holding force is a free-nut that is not welded to the respective side member.

* * * * *